(12) United States Patent
Davis et al.

(10) Patent No.: US 11,345,189 B2
(45) Date of Patent: May 31, 2022

(54) BRAKE ASSEMBLIES HAVING A WHEEL HUB, BRAKE DISC, AND SPACERS

(71) Applicant: Webb Wheel Products, Inc., Cullman, AL (US)

(72) Inventors: Garrett W. Davis, Vinemont, AL (US); Johnathon K. Capps, Gardendale, AL (US); Dallas W. Garrison, Cullman, AL (US); Byron W. Hale, Cullman, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 458 days.

(21) Appl. No.: 16/688,792

(22) Filed: Nov. 19, 2019

(65) Prior Publication Data

US 2021/0146722 A1    May 20, 2021

(51) Int. Cl.
*F16D 65/12* (2006.01)
*B60B 27/00* (2006.01)
*F16D 65/02* (2006.01)

(52) U.S. Cl.
CPC ........ *B60B 27/0052* (2013.01); *F16D 65/123* (2013.01); *F16D 65/128* (2013.01); *B60B 2900/513* (2013.01); *F16D 2065/132* (2013.01); *F16D 2065/1328* (2013.01); *F16D 2065/1384* (2013.01)

(58) Field of Classification Search
CPC ........................ F16D 65/12; F16D 65/123–128
USPC .......................................... 188/18 A, 218 XL
See application file for complete search history.

(56) References Cited

U.S. PATENT DOCUMENTS

| | | | |
|---|---|---|---|
| 6,467,588 B1 * | 10/2002 | Baumgartner | F16D 65/123 188/218 XL |
| 6,564,913 B2 | 5/2003 | Baumgartner et al. | |
| 6,626,273 B1 | 9/2003 | Baumgartner et al. | |
| 6,722,479 B2 | 4/2004 | Baumgartner et al. | |
| 6,910,556 B1 * | 6/2005 | Baumgartner | F16D 65/12 188/218 XL |
| 7,393,064 B2 | 7/2008 | Hall et al. | |
| 7,410,036 B2 | 8/2008 | Wimmer et al. | |
| 8,739,946 B2 * | 6/2014 | Pahle | F16D 65/123 188/218 XL |
| 10,066,691 B2 | 9/2018 | Jones et al. | |
| 2004/0178030 A1 * | 9/2004 | Pacchiana | F16D 65/128 188/218 XL |

(Continued)

*Primary Examiner* — Christopher P Schwartz
(74) *Attorney, Agent, or Firm* — Andrus Intellectual Property Law, LLP (57) ABSTRACT

A brake assembly includes a wheel hub having a radially-outer diameter and a plurality of splines that are spaced apart around the radially-outer diameter. A brake disc is mounted on the wheel hub and has a radially-inner diameter and a plurality of pockets that are spaced apart around the radially-inner diameter. The pockets receive the splines such that the brake disc rotates with the wheel hub. Each pocket has opposing axially-extending side walls. Each side wall has an outwardly-chamfered outboard end and an inboard locking recess. A plurality of spacers are radially disposed between the splines and pockets. Each spacer has opposing arms connected together by a brace. Each arm has an outwardly-chamfered end and outwardly-projecting locking foot which together mate with the outwardly chamfered outboard end and inboard locking recess, respectively, so as to lock the spacer in the pocket.

25 Claims, 10 Drawing Sheets

(56) References Cited

U.S. PATENT DOCUMENTS

2007/0084685 A1\* 4/2007 Wimmer ................. F16D 65/12
188/218 XL
2010/0307875 A1\* 12/2010 Ilg ........................... F16D 65/12
188/218 XL
2017/0122391 A1\* 5/2017 Pahle .................... F16D 65/123

\* cited by examiner

BRAKE ASSEMBLIES HAVING A WHEEL HUB, BRAKE DISC, AND SPACERS

FIELD

The present disclosure relates to brake assemblies, and more particularly to brake assemblies having a wheel hub, a brake disc, and spacers facilitating secure connection between the wheel hub and brake disc.

BACKGROUND

U.S. Pat. No. 10,066,691 discloses a brake disc assembly for attachment to a brake disc hub having a plurality of circumferentially spaced outwardly radially extending hub projections. The brake disc assembly comprises a brake disc having a first side and a second opposing side which is arranged to face the brake disc hub. The brake disc comprises a plurality of circumferentially spaced outwardly extending disc recesses each having first and second recess sidewalls which oppose each other. Each disc recess is provided with first and second intermediate elements which each have a spacer portion adjacent to a respective recess sidewall and a flange portion which is secured to the brake disc. Each disc recess is arranged to receive a corresponding hub projection between the spacer portions of the first and second intermediate elements.

U.S. Pat. No. 7,410,036 discloses a brake-disc/hub assembly is provided with a disc/hub connection for connecting a brake disc to a brake disc hub. The brake disc includes support elements on the inner circumference thereof, the brake disc hub is provided on the outer circumference thereof with cams, and intermediate elements are radially distributed in the circumferential direction between the brake disc hub and the brake disc, extending into cavities running in the circumferential direction between the cams and the support elements and, hence, providing a transfer of the braking force from the brake disc to the brake disc hub. Each intermediate element includes two shoulders running at least completely or essentially in parallel to each other, whereby one shoulder contacts a corresponding cam and the other shoulder contacts a corresponding support element, embodied such that the total thickness of opposing shoulders on the elements may be reduced for disassembly thereof.

U.S. Pat. No. 7,393,064 discloses a drum or rotor wheel hub having a cast hub having a machined pilot in a flange portion and a machined pilot in a cylindrical portion, and a cast portion which separates the cylindrical pilot from the flange pilot, whereby a machined radii is not incorporated in the pilot construction.

U.S. Pat. No. 6,722,479 discloses a wheel and/or brake disc hub for receiving a one-piece or multi-piece, and notably fragmented, brake disc having friction rings which are preferably connected via links. The hub is configured such that cams of the hub have shoulders which protrude radially outwards and on one side axially secure the brake disc positioned on the hub. The brake disc is axially stepped at its inner periphery in such a way that a step is formed which is supported on the shoulder.

U.S. Pat. No. 6,564,913 discloses a brake disc/hub assembly for vehicle disc brakes having a hub and a brake disc, which is arranged thereon in a manner that prevents it from turning. The brake disc is arranged in the axial direction of the hub in such a manner that it can be axially displaced against an elastic pre-tensioning exerted by a number of spring elements.

U.S. Pat. No. 6,626,273 discloses a brake disc comprising two friction rings which are connected via links and between which an air channel is configured, as well as support elements which are molded to the inner peripheral area of the brake disc and designed for engaging cams of a hub of an axle of a (utility) vehicle. In the inner peripheral area of the brake disc, the support elements bridge the air channel in the manner of links and axially protrude into the area of the friction rings to such an extent that the outer surfaces of the friction rings are situated at an axial distance from the outer surfaces of the support elements even in the maximum permissible state of wear. Openings in the axle hub and the brake disc ensure sufficient cooling.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain examples disclosed herein a brake assembly is for a vehicle. The brake assembly includes a wheel hub extending from inboard to outboard along an axis of rotation. The wheel hub has a radially-outer diameter and a plurality of splines that are spaced apart around the radially-outer diameter. A brake disc is mounted on the wheel hub. The brake disc has a radially-inner diameter and a plurality of pockets that are spaced apart around the radially-inner diameter, the plurality of pockets receiving the plurality of splines such that the brake disc rotates with the wheel hub. Each pocket has opposing axially-extending side walls, each side wall having an outwardly-chamfered outboard end and an inboard locking recess. A plurality of spacers are radially disposed between the splines and pockets, each spacer having opposing arms connected together by a brace. Each arm has an outwardly-chamfered end and outwardly-projecting locking foot which together mate with the outwardly-chamfered outboard end and inboard locking recess, respectively, so as to lock the spacer in the pocket.

BRIEF DESCRIPTION OF THE DRAWINGS

Examples are herein disclosed with reference to the following drawing figures. The same numbers are used throughout to reference like features and components.

DETAILED DESCRIPTION

During research and experimentation, the present inventors have endeavored to improve upon existing splined disc brake rotors, for example, to make them easier to install, easier to remove, contain less components, and reduce the propensity for corrosion in connecting elements. The present disclosure is a result of these efforts.

Figures 1, 2:
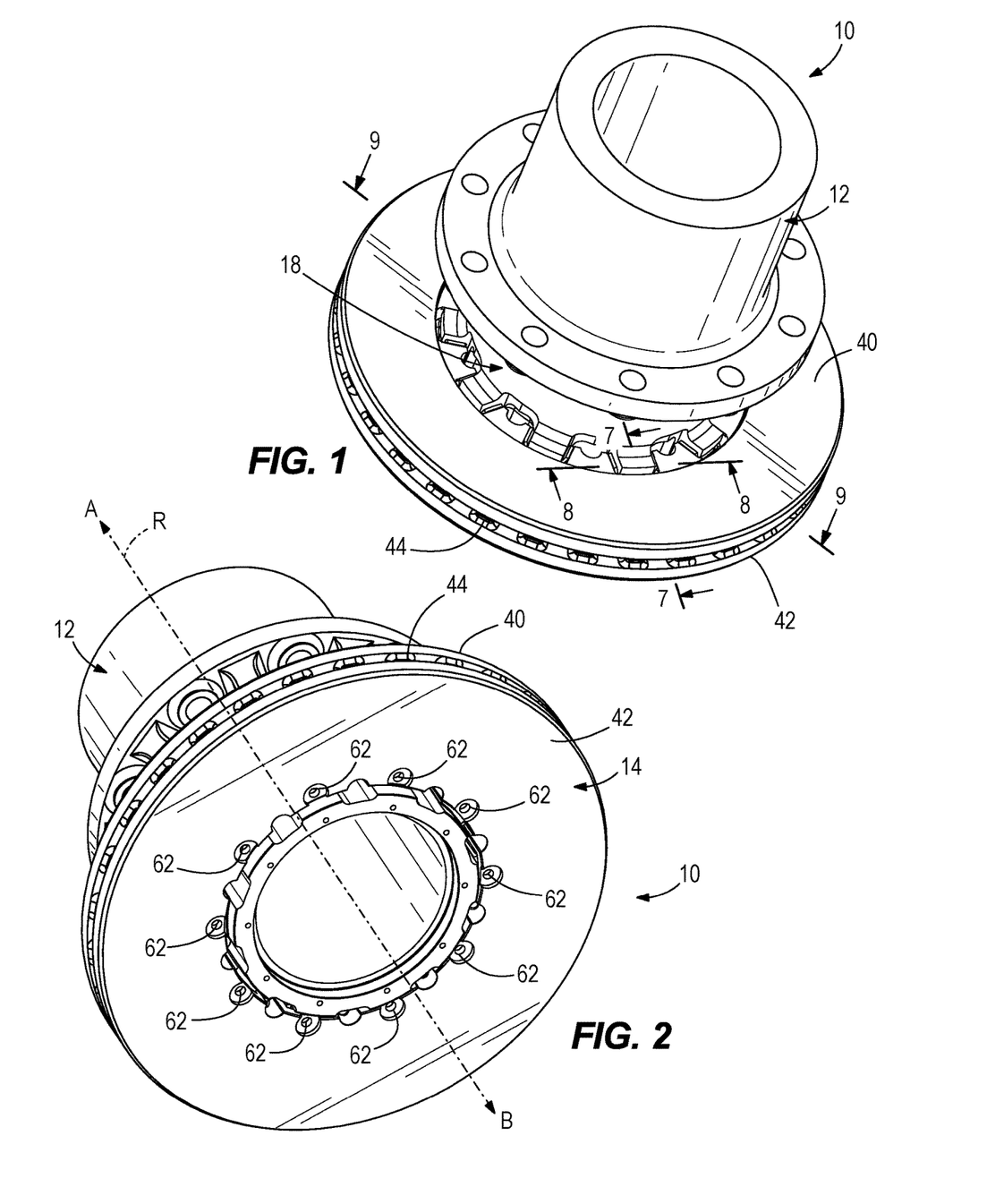
FIG. 1 is a perspective view of an assembled brake assembly according to a first embodiment of the present disclosure.
FIG. 2 is an opposite perspective view of the assembled brake assembly.
Figure 3:
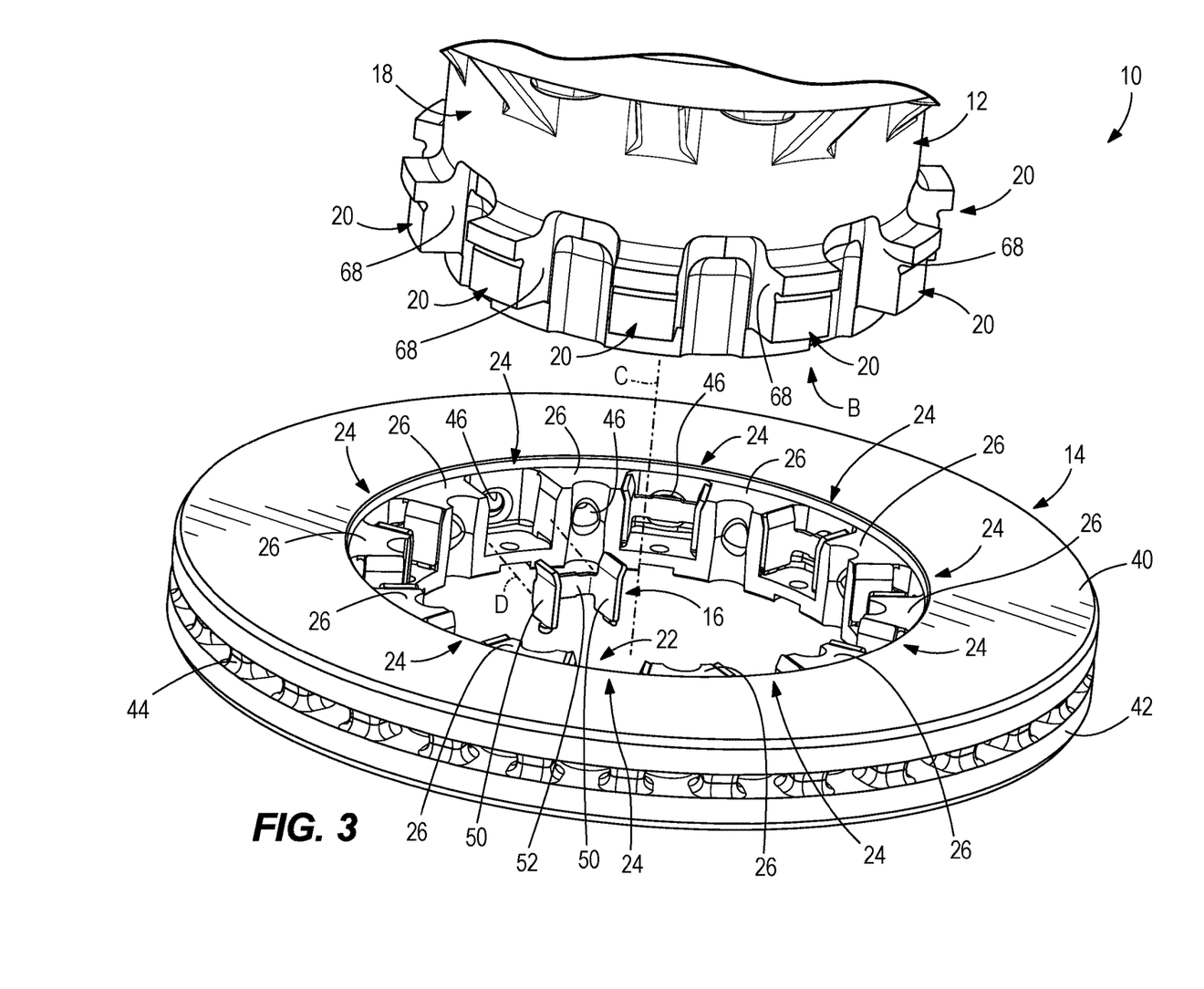
FIG. 3 is an exploded perspective view of the brake assembly, including wheel hub, spacer and brake disc.
Figure 4:
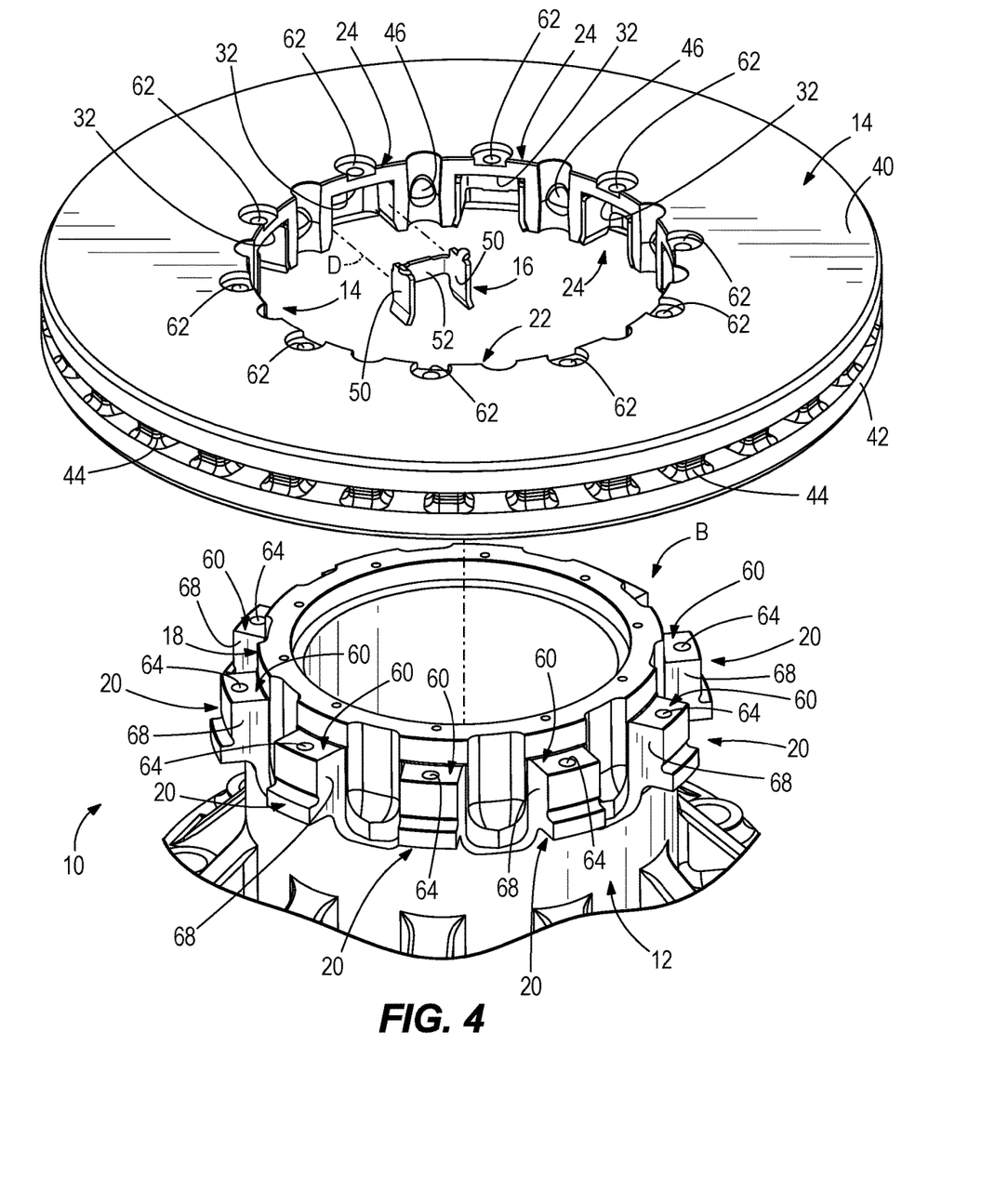
FIG. 4 is an opposite exploded perspective view of the brake assembly.

FIGS. 1-9 depict a first embodiment of a brake assembly 10 for a vehicle. Referring to FIGS. 1 and 2, the brake assembly 10 includes a metal (e.g. aluminum) wheel hub 12, a metal (e.g. gray iron) brake disc 14 mounted on the wheel hub 12 and a plurality of metal (e.g. stainless steel) spacers 16 (see FIG. 6) for securely coupling the wheel hub 12 and brake disc 14. Referring to FIG. 2, the wheel hub 12 extends from inboard end A to an outboard end B along an axis of rotation R about which the brake assembly 10 rotates during movement of the associated vehicle. Referring to FIGS. 3 and 4, the wheel hub 12 has a radially-outer diameter 18 and hub splines 20 that are spaced apart around the radially outer diameter 18 proximate to the outboard end B of the wheel hub 12.

The brake disc 14 has a radially-inner diameter 22 (see FIG. 4) and pockets 24 (see FIG. 3) that are spaced apart around the radially-inner diameter 22. The pockets 24 are separated from each other by rotor splines 26, which are interdigitated amongst the pockets 24. As shown by a dash-and-dot line C in FIGS. 3 and 4, the pockets 24 are configured to receive the hub splines 20 when the brake disc 14 is axially mounted onto the outboard end B of the wheel hub 12, as shown in FIGS. 1, 2, and 7-9. Nested engagement of the hub splines 20 into the pockets 24, between the interdigitated rotor splines 26, facilitates coupling of the brake disc 14 to the wheel hub 12 such that the brake disc 14 rotates with the wheel hub 12 about axis of rotation R.

Figure 9:
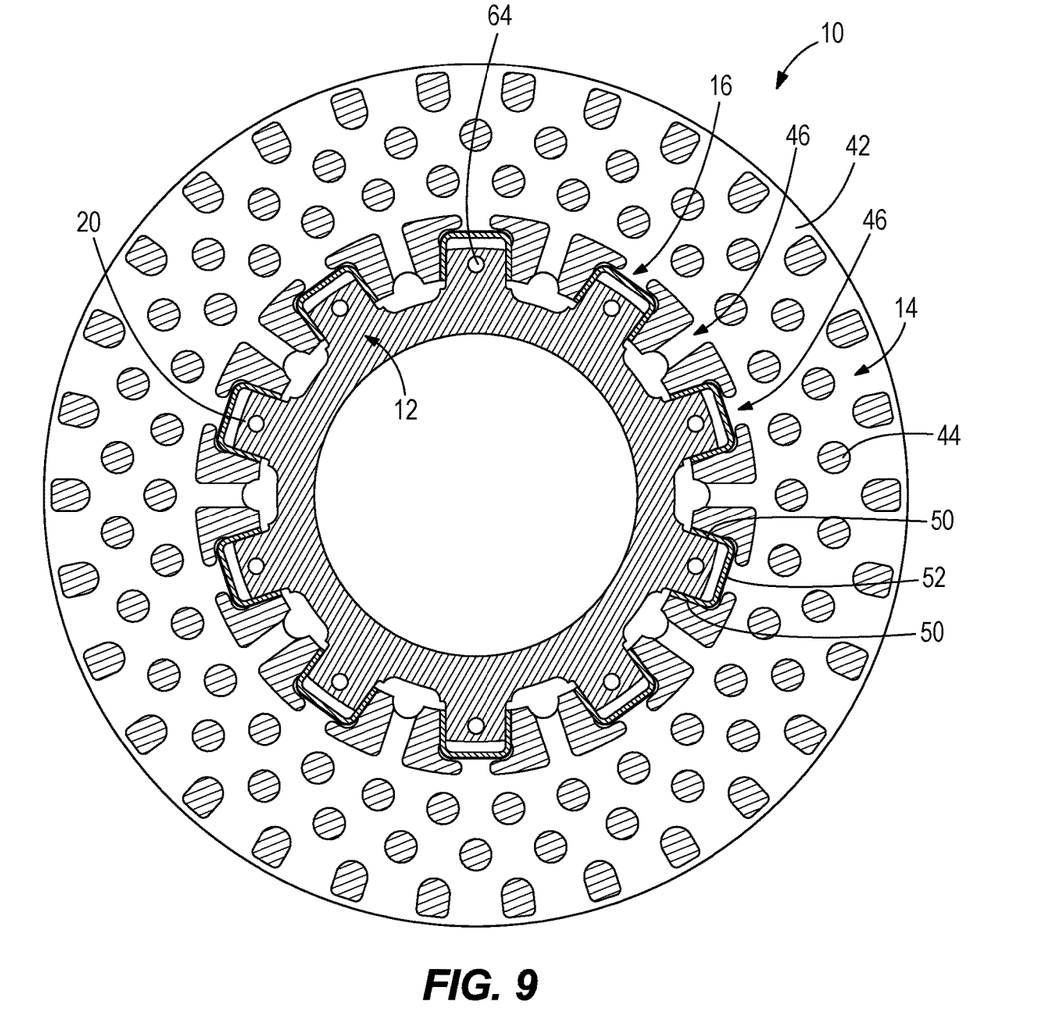
FIG. 9 is an end view of the brake assembly.

Referring to FIGS. 3-4 and 9, the brake disc 14 has inboard and outboard cheeks 40, 42 that are axially spaced apart from each other such that air can flow there between. A plurality of axially-extending posts 44 connect the inboard and outboard cheeks 40, 42, and are also spaced apart from each other such that the air can flow there between. Radially-inwardly oriented ports 46 are formed through the inner diameter 22 of the brake disc 14 and are configured to allow airflow radially inwardly from between the inboard and outboard cheeks 40, 42 to the wheel hub 12. The ports 46 are formed through brake disc 14 at the pockets 24 and at the rotor splines 26.

Figure 5A:
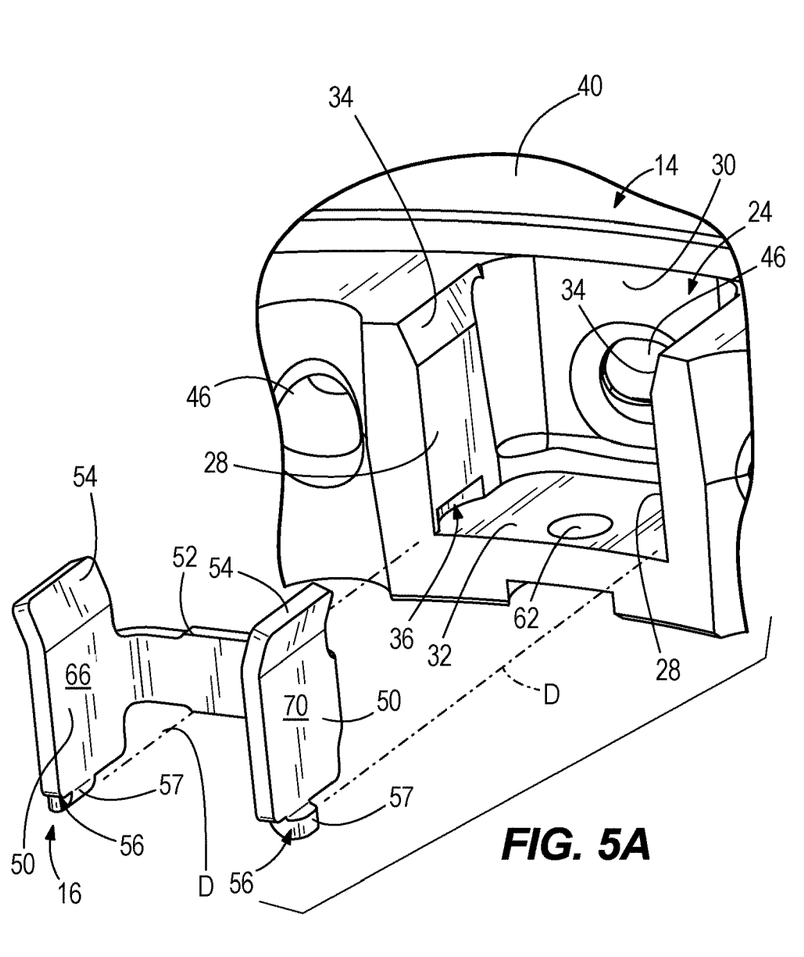
FIGS. 5A and 5B are exploded perspective views of the spacer and a pocket on the brake disc.
Figure 5B:
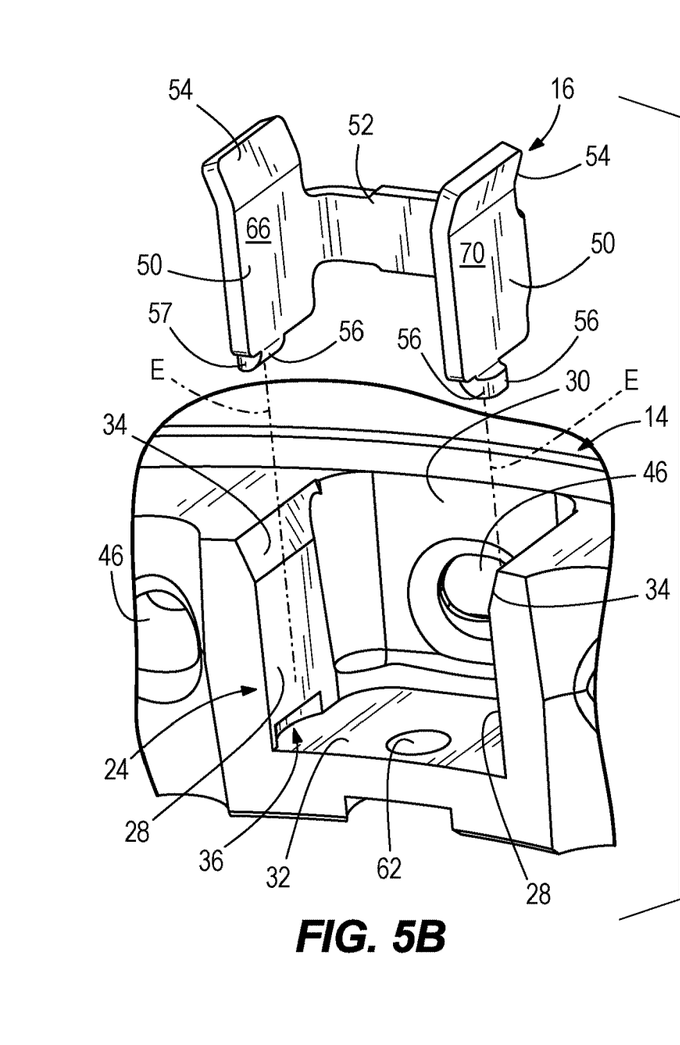

Referring to FIGS. 5A and 5B, each pocket 24 has opposing axially-extending side walls 28, a radially-outer side wall 30 extending between the axially-extending side walls 28, and an axial end wall 32 extending transversely between the axially-extending sidewalls 28 and extending transversely from the radially-outer side wall 30. Each axially-extending side wall 28 has an outwardly-chamfered outboard end 34 and an inboard locking recess 36. The inboard locking recess 36 extends into the axially-extending sidewall 28 and is located adjacent the axial end wall 32.

Figure 6:
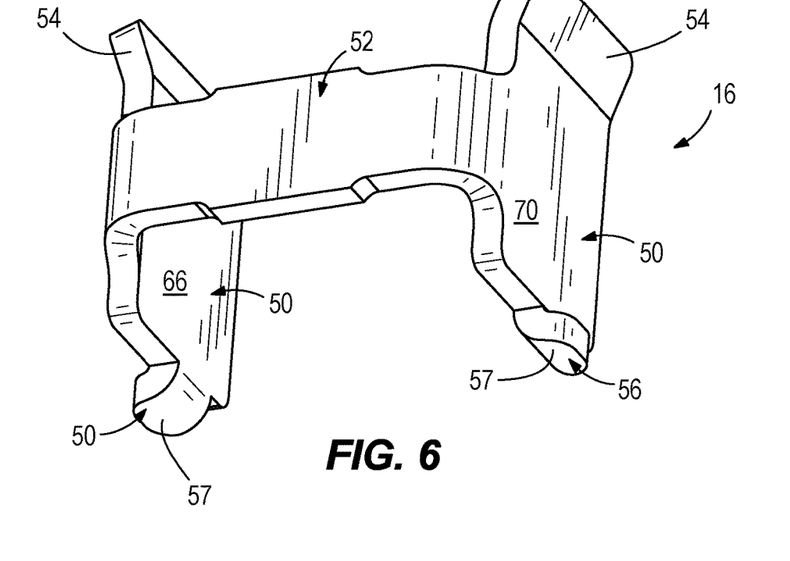
FIG. 6 is a perspective view of the spacer.
Figure 7:
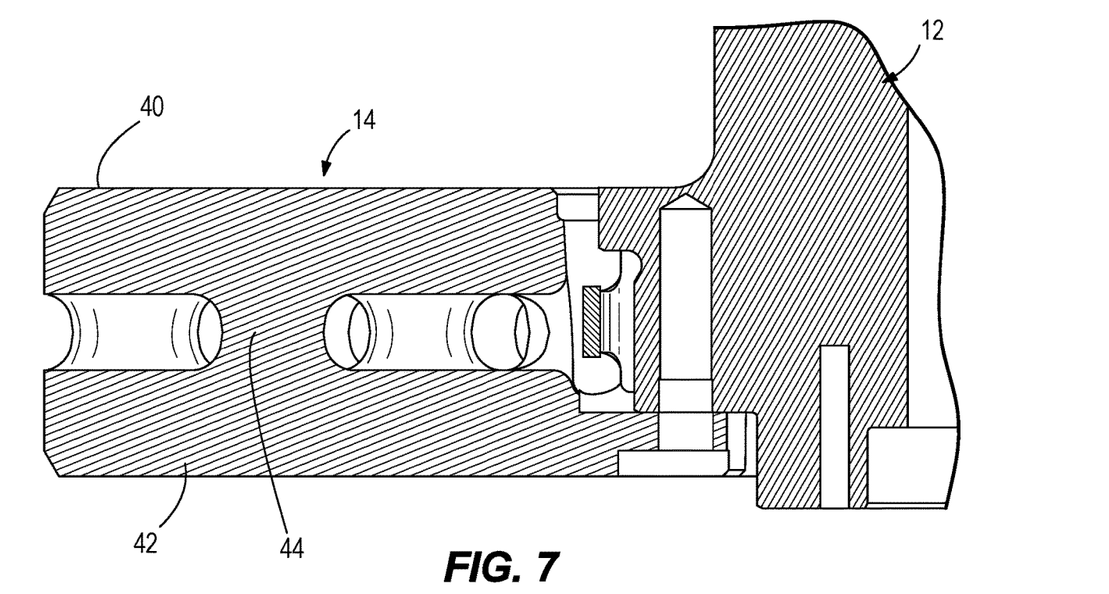
FIG. 7 is a view of section 7-7, taken in FIG. 1.
Figure 8:
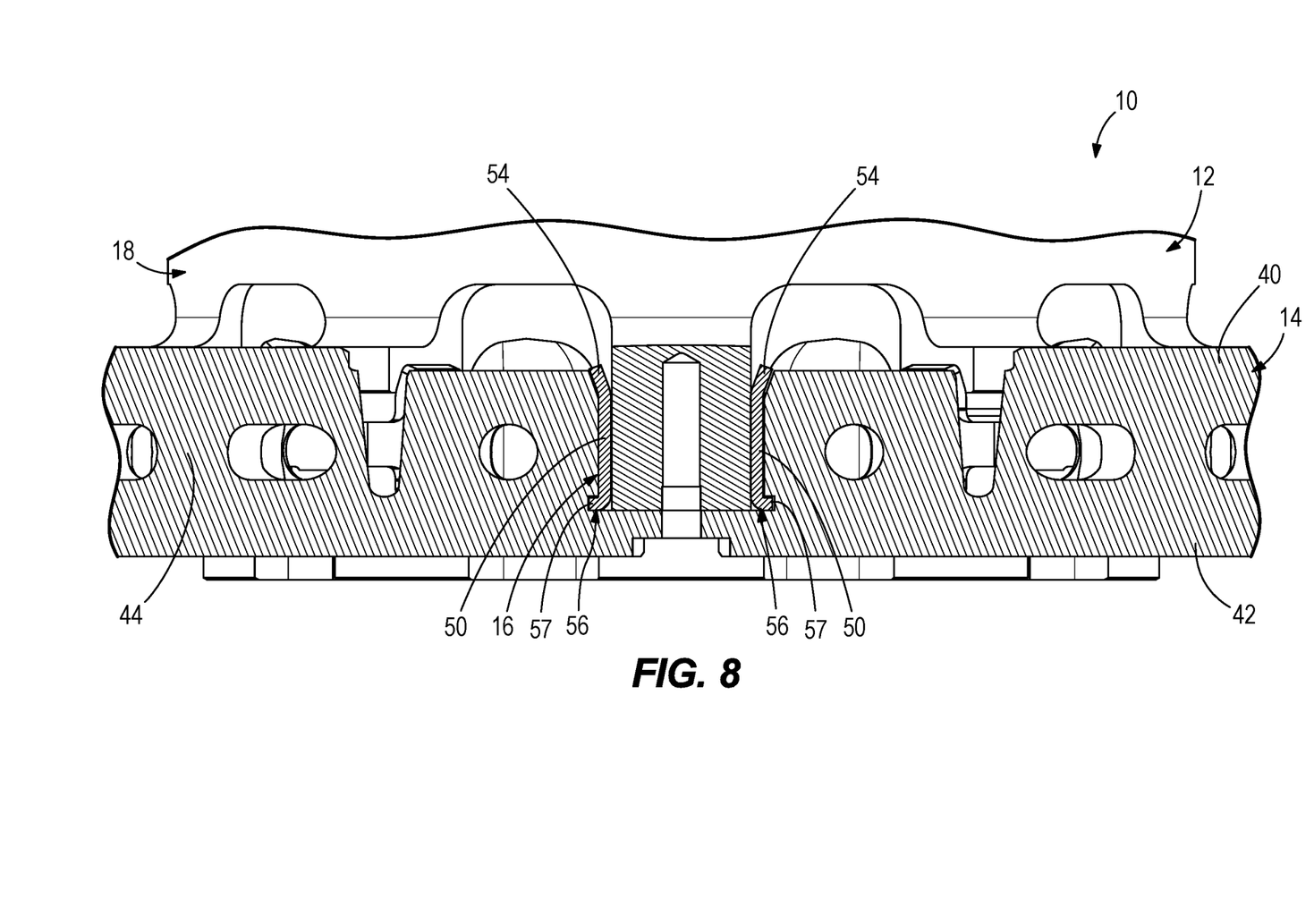
FIG. 8 is a view of section 8-8, taken in FIG. 1.

Referring to FIGS. 5-6, the spacers 16 are generally U-shaped and are radially disposed between the hub splines 20 and the pockets 24 on the brake disc 14. Each spacer 16 has a width that is slightly smaller than the width of the pockets 24 so that the spacer 16 can be radially installed into the pocket 24, as shown by dash-and-dot line D in FIGS. 3, 4 and 5A. The spacers 16 are advantageously configured so that they can alternatively be axially installed into the pocket 24, as shown by the dash-and-dot line E in FIG. 5B. Referring to FIG. 6, each spacer 16 has opposing, axially-extending arms 50 that are connected together by a brace 52. Each arm 50 is a mirror image of the other arm 50 and has an outwardly-chamfered end 54 and an outwardly-projecting locking foot 56 which together mate with the outwardly-chamfered outboard end 34 and inboard locking recess 36 of the axially-extending sidewall 28 in the pocket 24, so as to securely register or lock the spacer 16 in the pocket 24. In this example, the outwardly-projecting locking foot 56 is a tab 57 that is narrower than the respective arm 50 of the spacer 16, and is located along an end of the arm 50 that is opposite the outwardly-chamfered end 54. The brace 52 is generally centrally located with respect to the arms 50 and is sized shorter than the height of the arms 50. The brace 52 extends between the arms 50 and, referring to FIG. 9, is located adjacent the radially-outer end wall 30 when the spacer 16 is disposed in the pocket 24. As shown in FIG. 9, the brace 52 extends across the radially-inwardly oriented port 46 through which air flows from the brake disc 14 into the pocket 24.

Referring to FIG. 4, each hub spline 20 has a mounting face 60 that is located adjacent to (i.e., faces) the axial end wall 32 of the pocket 24 when the brake disc 14 is coupled to the wheel hub 12. Referring to FIG. 4 and FIGS. 5A and 5B, an axially-extending through-bore 62 extends through the axial end wall 32 and is aligned with an axially-extending threaded counter-bore 64 in the mounting face 60. A threaded fastener (not shown) extends through the through-bore 62 and into threaded engagement with the counter-bore 64 to thereby axially couple the brake disc 14 to the wheel hub 12. The fastener optionally can be coated with a conventional corrosion resistant material.

Referring to FIGS. 3-5, in the installed position, the opposing arms 50 of each spacer 16 have inwardly-oriented side faces 66 (see FIG. 5) and each hub spline 20 has opposing radially-outwardly oriented side faces 68 (see FIG. 4) that face the inwardly-oriented side faces 66 in the installed position. The opposing arms 50 further have outwardly-oriented faces 70 (see FIG. 5) that face the axially-extending sidewalls 28 (see FIG. 5) of the pocket 24 in the installed position.

Figure 10:
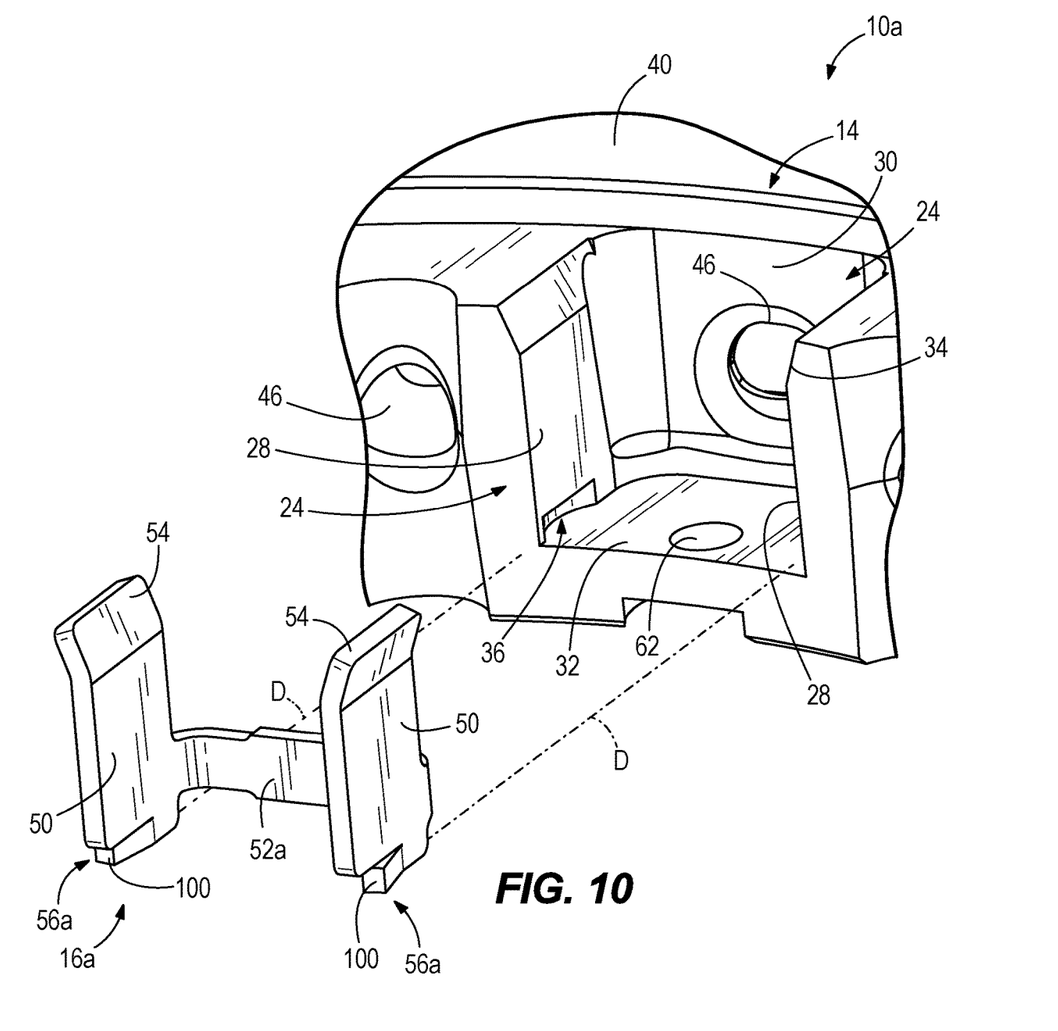
FIG. 10 is a perspective view of a spacer according to a second embodiment of the present disclosure.
Figure 13:
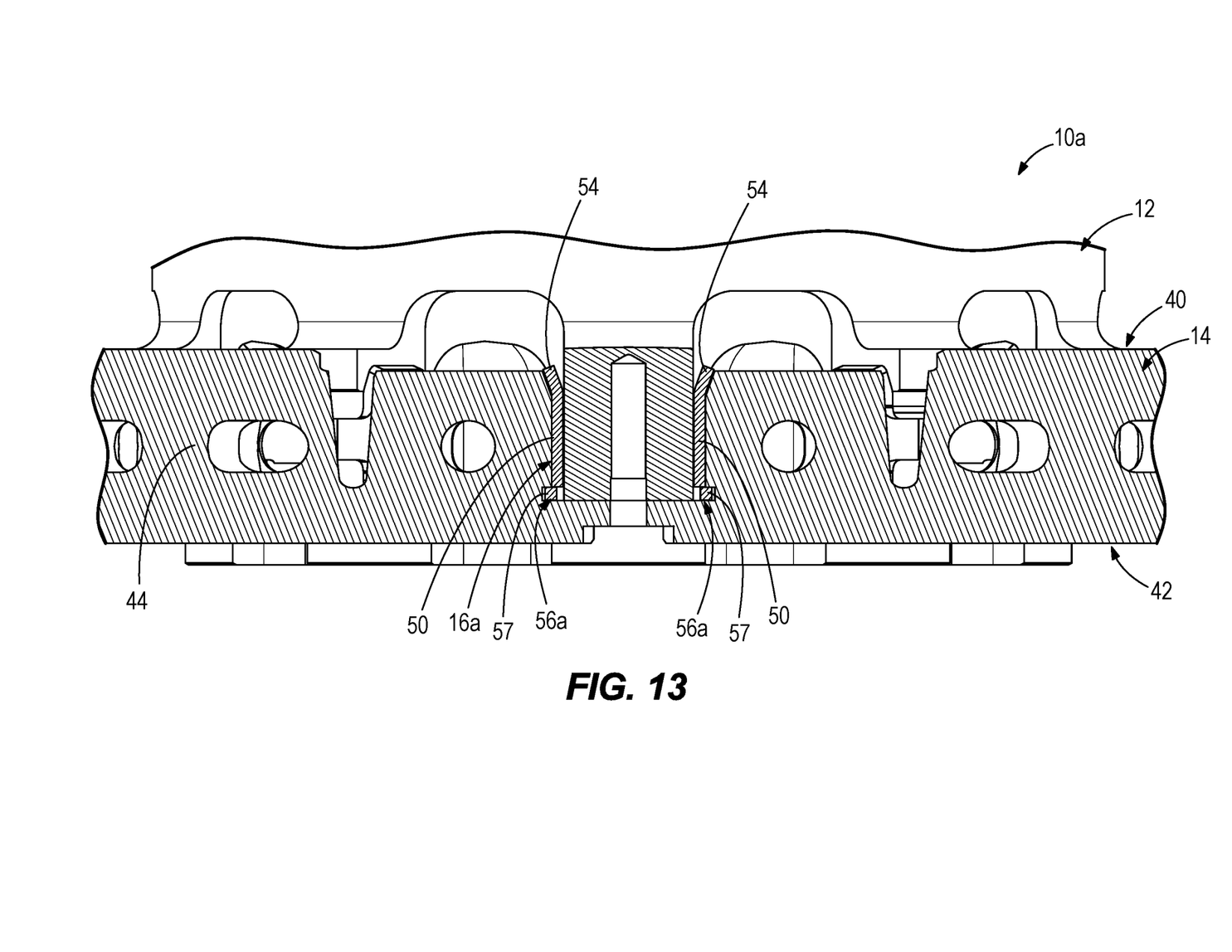

FIGS. 10-13 depict a second embodiment of a brake assembly 10a for a vehicle. Like reference numbers are utilized for structures that are the same or similar to the first embodiment of the brake assembly 10. Referring to FIGS. 10-13, the second embodiment of the brake assembly 10a has a locking foot 56a that is an outwardly projecting via a flared member 100 which extends angularly outwardly from the respective arm 50 of the spacer 16a. The locking foot 56a is cantilevered from the respective arm 50 and bendable into and out of flush alignment with the respective arm 50. As such, as shown in FIG. 10, when the spacer 16a is radially installed in the direction of the dash-and-dot lines D, into the pocket 14, the locking feet 56a, and particularly the cantilevered, flared member 100, are bent via a camming action upon engagement with the sidewalls 28, into flush or near flush alignment with the respective arms 50 of the spacer 56a. Continued insertion of the spacer 56a into the pocket 14 brings the flared members 100 into alignment with the inboard locking recesses 36, which allows the natural resiliency of the flared members 100 to cause the flared members 100 to spring back outwardly into the position shown in FIGS. 10 and 11, and into particularly engagement with the locking recesses 36, as shown in FIG. 13, in a snap-fit engagement. Optionally, this can provide an audible click sound, assuring the technician that the spacer 56*a* is properly installed and fully engaged in the pocket 14.

Figure 11:
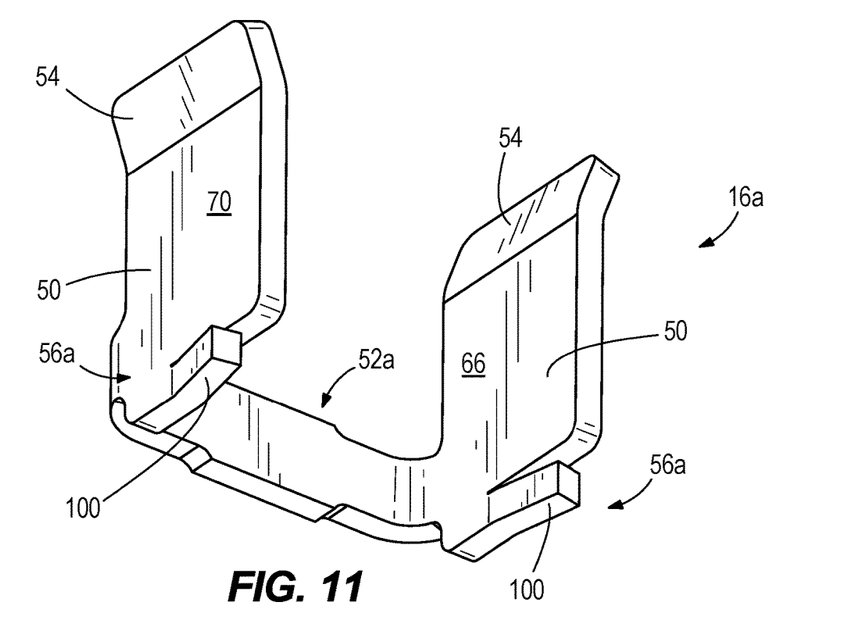
FIG. 11 is a perspective view of a second embodiment of the spacer.
Figure 12:
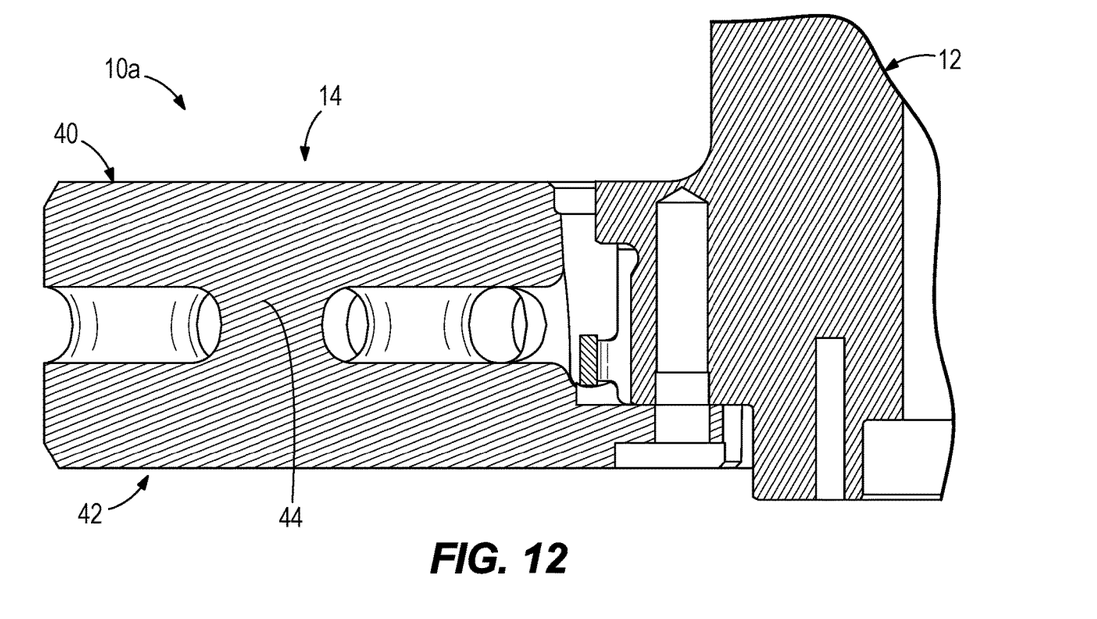
FIGS. 12 and 13 are like FIGS. 7-8, however showing the second embodiment.

Compared to the first embodiment, the spacer 56*a* has a brace 52 that is located closer to the outwardly projecting locking foot 56*a* than to the outwardly chamfered end 54, thus advantageously allowing more airflow through the airflow port 56, i.e. the brace 52*a* does not block airflow through the port 46 as much as the first embodiment.

Through research and experimentation, the present inventors also realized that the width of the brace 52, 52*a*, is preferably about or exactly 0.25 inch at a given clip width of 0.1 in. This sizing allows the spacer 16*a* to flex and thus allows for manual installation into the pocket 14. Optionally, the ratio of the "clip to bandwidth" can preferably be between 1 and 50, or preferably between 1 and 10. It should be noted that these dimensions are only examples and are not limiting on the disclosure of the present invention.

The present disclosure thus advantageously provides brake disc assembly that is easier to assemble than the prior art. Mating interaction between the locking feet on the spacer and the pocket of the brake disc promotes secure engagement within the splined outer section of the relatively heavy wheel hub. The pocket and foot interconnection advantageously allows for insertion (either radially or axially) and retention of the spacer elements without the need for bolts or other mechanical fasteners. Forming the spacers of stainless steel advantageously impedes corrosion between the gray iron brake disc and the aluminum wheel hub. Optionally the entire assembly can be FNC (ferritic nitrocarburizing) treated to further improve corrosion resistance.

The present disclosure thus advantageously provides an improved brake disc assembly for mounting to a wheel hub on a vehicle. The wheel hub extends from inboard to outboard along an axis of rotation and has a radially-outer diameter and a plurality of splines that are spaced apart around the radially-outer diameter. The brake disc assembly includes a brake disc configured for mounting on the wheel hub, the brake disc having a radially-inner diameter and a plurality of pockets that are spaced apart around the radially-inner diameter. The plurality of pockets is configured to receive the plurality of splines such that the brake disc rotates with the wheel hub. Each pocket has opposing axially-extending side walls, each side wall having an outwardly-chamfered outboard end and an inboard locking recess. A plurality of spacers are configured to be radially disposed between the splines and pockets, each spacer comprising opposing arms connected together by a brace. Each arm has an outwardly-chamfered end and outwardly-projecting locking foot which together mate with the outwardly chamfered outboard end and inboard locking recess, respectively, so as to lock the spacer in the pocket. Each spacer has a generally U-shape formed by the opposing arms and brace; and the outwardly-projecting locking foot is located along an end of the arm that is opposite the outwardly-chamfered end.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A brake assembly for a vehicle, the brake assembly comprising:
   a wheel hub extending from inboard to outboard along an axis of rotation, the wheel hub having a radially-outer diameter and a plurality of hub splines that are spaced apart around the radially-outer diameter;
   a brake disc mounted on the wheel hub, the brake disc having a radially-inner diameter and a plurality of pockets that are spaced apart around the radially-inner diameter, the plurality of pockets receiving the plurality of hub splines such that the brake disc rotates with the wheel hub, wherein each pocket has opposing axially-extending side walls, each axially-extending side wall having an outwardly-chamfered outboard end and an inboard locking recess; and
   a plurality of spacers radially disposed between the hub splines and pockets, each spacer comprising opposing arms connected together by a brace, each arm having an outwardly-chamfered end and outwardly-projecting locking foot which together mate with the outwardly-chamfered outboard end and inboard locking recess, respectively, so as to register the spacer in the pocket.

2. The brake assembly according to claim 1, wherein each pocket has a radially-outer side wall extending between the axially-extending side walls, and wherein the brace is adjacent the radially-outer side wall.

3. The brake assembly according to claim 2, wherein the brace extends across a radially-inwardly oriented port through which air flows from the brake disc into the pocket.

4. The brake assembly according to claim 1, wherein each pocket further has an axial end wall extending between the axially-extending side walls and wherein the locking recess extends into the axially-extending side wall and is adjacent to the axial end wall.

5. The brake assembly according to claim 1, wherein each pocket further has an axial end wall and wherein each hub spline has a mounting face that is adjacent the axial end wall of the pocket.

6. The brake assembly according to claim 5, further comprising an axially-extending through-bore in the axial end wall that is aligned with an axially-extending threaded counter-bore in the mounting face, and a threaded fastener extending through the through-bore and into threaded engagement with the threaded counter-bore to thereby axially couple the brake disc to the wheel hub.

7. The brake assembly according to claim 6, wherein the opposing arms of each spacer further have outwardly-oriented faces that face the axially-extending sidewalls of the pocket.

8. The brake assembly according to claim 1, wherein the opposing arms of each spacer has inwardly-oriented faces and wherein each hub spline has opposing radially outwardly-oriented side faces that face the inwardly-oriented faces of the opposing arms.

9. The brake according to claim 1, wherein the brake disc comprises inboard and outboard cheeks that are axially spaced apart from each other such that air can flow there between.

10. The brake assembly according to claim 9, further comprising a plurality of posts that connect the inboard and outboard cheeks, wherein the plurality of posts are spaced apart from each other such that the air can flow between the inboard and outboard cheeks.

11. The brake assembly according to claim 10, further comprising radially-inwardly oriented ports formed through the inner diameter of the brake disc and allowing airflow radially inwardly from between the inboard and outboard cheeks to the wheel hub.

12. The brake assembly according to claim 1, wherein the outwardly-projecting locking foot is a tab that is narrower than the respective arm of the spacer.

13. The brake assembly according to claim 1, wherein the outwardly-projecting locking foot is a flared member that angularly extends from the respective arm of the spacer.

14. The brake assembly according to claim 13, wherein the outwardly-projecting locking foot is cantilevered from the respective arm of the spacer, and bendable so as to snap-fit with the in board locking recess when the respective spacer is radially inserted into the respective pocket.

15. The brake assembly according to claim 1, wherein the outwardly-projecting locking foot is located along an end of the arm that is opposite the outwardly-chamfered end.

16. The brake assembly according to claim 1, wherein the brace is located closer to the outwardly-projecting locking foot than to the outwardly-chamfered end.

17. The brake assembly according to claim 1, wherein the brace is generally centrally located with respect to the opposing arms.

18. The brake assembly according to claim 1, wherein the opposing arms are mirror-images of each other.

19. The brake assembly according to claim 1, wherein each spacer has a generally U-shape formed by the opposing arms and brace.

20. The brake assembly according to claim 1, wherein each spacer has a width that is slightly smaller than a width of the pockets.

21. The brake assembly according to claim 1, wherein the brace has a width of 0.25 inches.

22. A brake assembly for mounting to a wheel hub on a vehicle, the wheel hub extending from inboard to outboard along an axis of rotation, the wheel hub having a radially-outer diameter and a plurality of splines that are spaced apart around the radially-outer diameter; the brake disc assembly comprising:
   a brake disc configured for mounting on the wheel hub, the brake disc having a radially-inner diameter and a plurality of pockets that are spaced apart around the radially-inner diameter, the plurality of pockets configured to receive the plurality of splines such that the brake disc rotates with the wheel hub, wherein each pocket has opposing axially-extending side walls, each side wall having an outwardly-chamfered outboard end and an inboard locking recess; and
   a plurality of spacers configured to be radially disposed between the splines and pockets, each spacer comprising opposing arms connected together by a brace, each arm having an outwardly-chamfered end and outwardly-projecting locking foot which together mate with the outwardly chamfered outboard end and inboard locking recess, respectively, so as to lock the spacer in the pocket.

23. A spacer for use in a brake disc assembly on a vehicle, the brake disc assembly having a brake disc and a wheel hub, the spacer comprising opposing arms that are connected together by a brace, each arm having an outwardly-chamfered end and outwardly-projecting locking foot which together are configured to mate with an outwardly chamfered outboard end and inboard locking recess, respectively, in a pocket on the brake disc; wherein each spacer has a generally U-shape formed by the opposing arms and brace; and wherein the outwardly-projecting locking foot is located along an end of the arm that is opposite the outwardly-chamfered end.

24. The brake assembly according to claim 23, wherein the outwardly-projecting locking foot is a flared member that angularly extends from the respective arm of the spacer.

25. The brake assembly according to claim 23, wherein the outwardly-projecting locking foot is cantilevered from the respective arm of the spacer, and bendable so as to snap-fit with the inboard locking recess when the respective spacer is radially inserted into the respective pocket.

* * * * *